United States Patent [19]

Akazawa

[11] Patent Number: 5,669,453

[45] Date of Patent: Sep. 23, 1997

[54] POWER CARVING TOOL

[75] Inventor: Shumi Akazawa, Fuchu, Japan

[73] Assignee: Ryobi Limited, Tokyo, Japan

[21] Appl. No.: 539,675

[22] Filed: Oct. 5, 1995

[30] Foreign Application Priority Data

Oct. 7, 1994 [JP] Japan .................. 6-243576

[51] Int. Cl.$^6$ .................................................. B23Q 5/10
[52] U.S. Cl. ................ 173/205; 173/124; 173/217; 30/169
[58] Field of Search ................ 173/205, 122, 173/124, 217; 30/169

[56] References Cited

U.S. PATENT DOCUMENTS

| | | | |
|---|---|---|---|
| 2,155,082 | 4/1939 | Decker | 173/217 |
| 2,794,621 | 6/1957 | Beeson | 173/205 |
| 3,449,967 | 6/1969 | Dancsik | 173/205 |
| 5,129,467 | 7/1992 | Watanabe et al. | 173/217 |
| 5,224,231 | 7/1993 | Nacar | 173/205 |
| 5,287,582 | 2/1994 | Kawai et al. | 173/205 |
| 5,533,581 | 7/1996 | Barth et al. | 173/217 |

*Primary Examiner*—Scott A. Smith
*Attorney, Agent, or Firm*—Brooks & Kushman P.C.

[57] ABSTRACT

A power carving tool has a housing, a driving motor, a cam shaft engaged with the rotary shaft of the driving motor and having a cooling fan, a cam sleeve with a slanted cam surface, engaged with the cam shaft and reliably held by a ball bearing supported by the housing, and an output shaft moved reciprocatingly by bringing a contact portion provided at the rear portion thereof into contact with the cam surface thereby to maintain a stable rotation of the cam sleeve and to avoid mechanical loss.

13 Claims, 7 Drawing Sheets

FIG.6
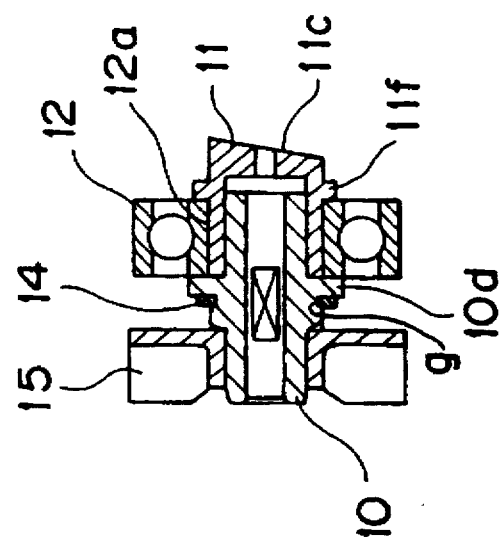
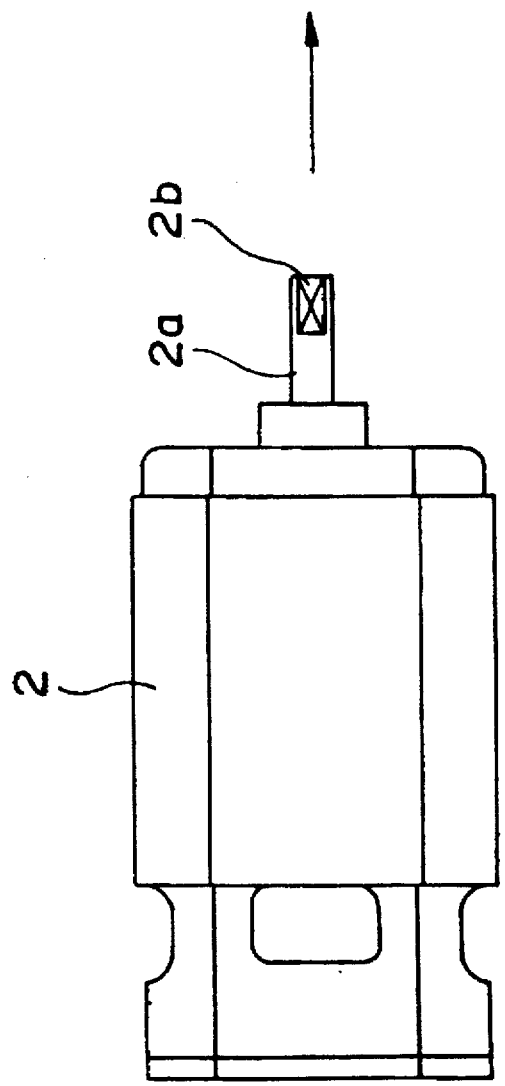

5,669,453

POWER CARVING TOOL

BACKGROUND OF THE INVENTION

This invention relates to a power carving tool for carving wood, marble, stone, etc.

There is known a power carving tool with a carving cutter moved reciprocatingly by electric power to carve wood, marble, stone, etc. Such a conventional power carving tool is shown in FIG. 8 in which an essential part thereof is enlarged. The conventional power carving tool has a driving motor 101 which is provided with a driving shaft 101a. A cam shaft 102 is connected to the driving shaft 101a. The cam shaft 102 has, at its front end, a washer 104 and a cam 105 integrally. The cam 105 has a slanted cam surface 105a. Further, the cam shaft 102 is held loosely by a ball bearing 103 which abuts against the washer 104 to restrict only the movement of the washer 104 in its axial direction. On the other hand, an output shaft 107 is disposed at a position opposed to the cam surface 105a so as to be moved in its axial direction, and its opposed end holds a steel ball 106. A carving cutter (not shown) is set at the front end of the output shaft 107 (right end in FIG. 8).

When the power carving tool is operated, the driving motor 101 is driven to rotate the cam shaft 102 and the cam 105. At the same time, the output shaft 107 is moved in the rear direction thereof (left in FIG. 8) so that the steel ball 106 abuts against the cam surface 105a of the cam 105. The output shaft 107 is moved reciprocatingly in the axial direction thereof in accordance with the rotation of the cam surface 105a. Thus, the carving cutter provided at the front end of the output shaft 7 is also moved reciprocatingly to carve a design in wood, marble or stone.

However, in the above conventional structure of the power carving tool, the cam 105 and the washer 104 are formed integrally with each other, and the surface of the washer 104 opposed to the side face of the ball bearing 103 must be formed precisely perpendicularly to the axis of the cam shaft 102 in order to ensure the smooth rotation of the cam shaft 102. It is also very difficult that the surface of the washer 104 attached to the cam 105 is formed precisely perpendicularly to the axis of the cam shaft 102. If the surface of the washer 104 is not formed precisely perpendicularly to the axis of the cam shaft 102, the cam shaft 102 is rotated about an axis slightly oblique to the axis of the ball bearing 103. Therefore, it causes a mechanical loss, the generation of heat, and the decrease of durability. Further, the cam 105 with the washer 104 can be moved away from the ball bearing 103 in the front direction thereof (right in FIG. 8), and the cam surface 105a may rotate in an unstable manner to generate a run-out. At this time, the steel ball 106 may strongly abut against the cam surface 105a to generate an abnormal sound. In addition, since the cam shaft 102 can be moved in its axial direction, if a cooling fan for cooling the motor 101 is provided on the cam shaft 102, the cooling fan may abut against the side face of the ball bearing. Therefore, the cooling fan cannot be provided on the cam shaft 102, and the cooling fan must be disposed at the rear position of the motor 101 (left side in FIG. 8). This structure needs an extra space for the cooling fan to enlarge the whole portion of the power carving tool.

SUMMARY OF THE INVENTION

It is an object to provide a power carving tool which has a good durability and can be formed compact as a whole.

According to this invention, there is provide a power carving tool for carving wood, marble, stone, etc., which comprises a housing, a rotary driving device, a cam shaft which is engaged with a driving shaft of the rotary driving device so as to be rotated together with the driving shaft, a cam sleeve which is engaged with the cam shaft so as to be rotated together with the cam shaft, which is held by a ball bearing supported in the housing so as to be rotated together with an inner ring of the ball bearing and which has, at its front face, a cam surface, and an output shaft which is disposed in such a manner that an axis of the output shaft is deviated from an axis of a united rotary driving shaft comprising the driving shaft of the rotary driving device, the cam shaft and the cam sleeve, which has, at its rear end, a contact portion for contacting the cam surface to be moved reciprocatingly in accordance with rotation of the united rotary driving shaft, and which holds detachably a carving cutter at its front end.

When a work is carved by this power carving tool, the rotary driving device is rotated to rotate the cam sleeve having a slanted surface together with the cam shaft engaged with the driving shaft of the rotary driving device. With this state, the contact portion provided at the rear end of the output shaft whose axis is deviated from the axis of the united rotary driving shaft is moved reawardy to be brought into contact with the cam surface while an operator brings a carving cutter held by the output shaft into contact with a work. Since the cam sleeve is held reliably by the inner ring of the ball bearing, the cam sleeve having the cam surface is steadily rotated to avoid mechanical loss to transmit smoothly the rotation of the driving shaft to the cam sleeve.

The nature, utility, and further features of this invention will be move clearly apparent from the following detailed description with respect to preferred embodiments of the invention when read in conjunction with the accompanying drawings briefly described below.

BRIEF DESCRIPTION OF THE DRAWINGS

In the accompanying drawings:

FIG. 6 is an enlarged view of an essential part showing another embodiment of the power carving tool according to this invention;

DESCRIPTION OF THE PREFERRED EMBODIMENTS

An embodiment of this invention will now be explained with reference to the attached drawings.

Figure 1:
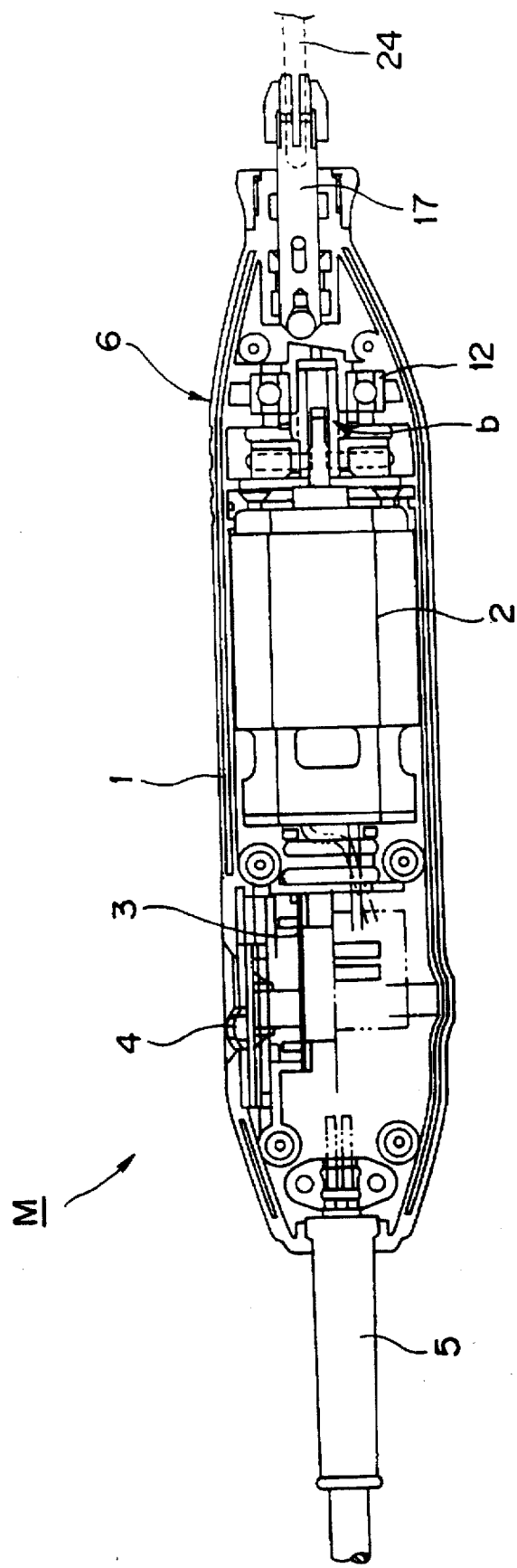
FIG. 1 is a side sectional view of a power carving tool according to this invention.
Figure 2:
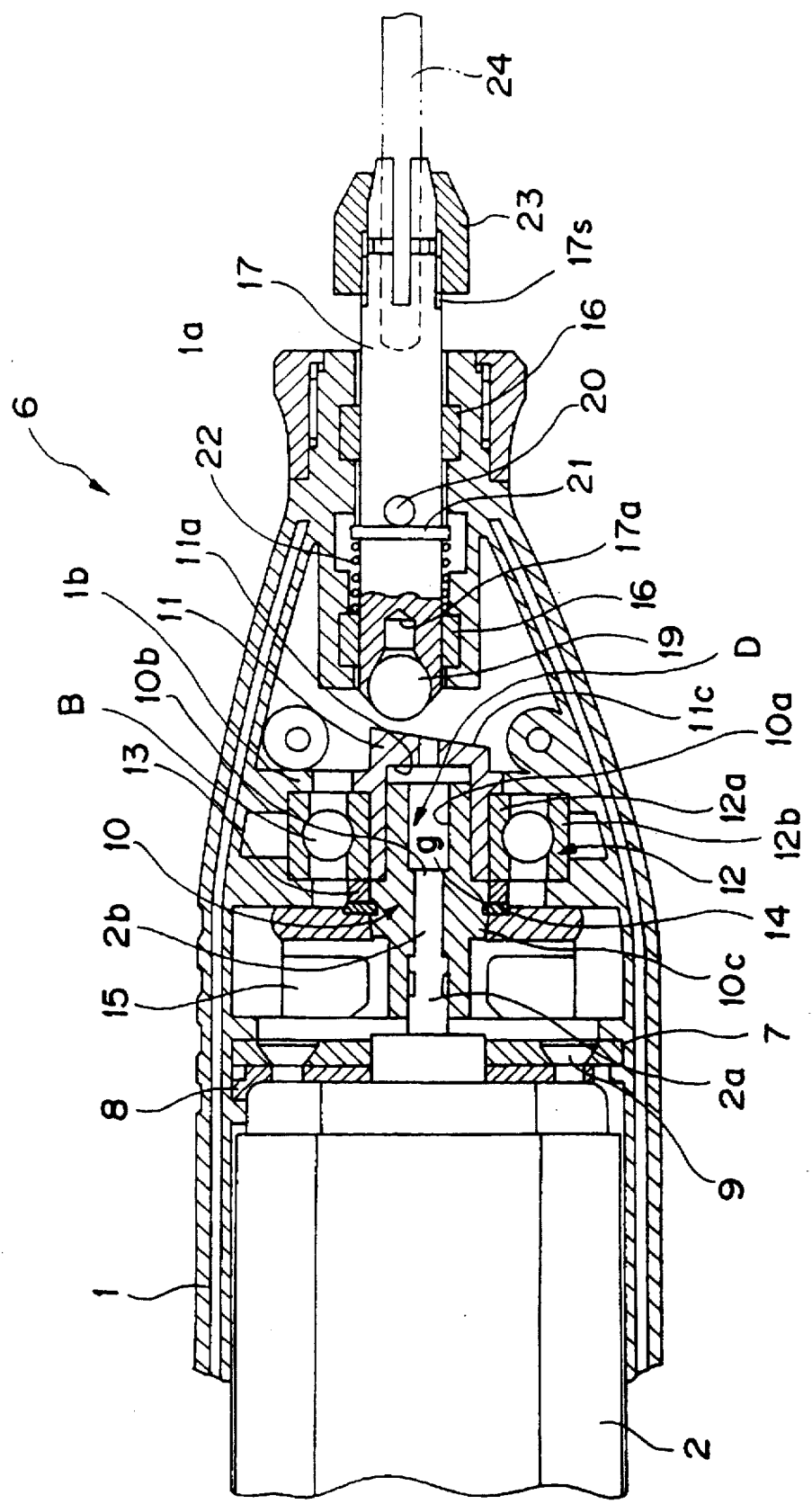
FIG. 2 is an enlarged sectional view of an operating portion of the power carving tool according to this invention.
Figure 3:
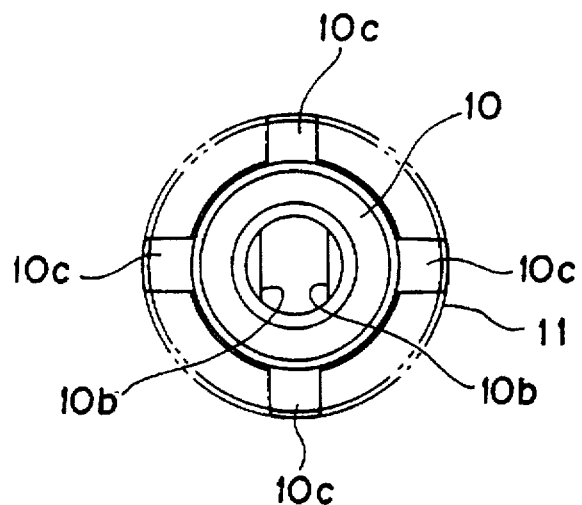
FIG. 3 is a front view of a cam shaft used for the power carving tool according to this invention.
Figure 4:
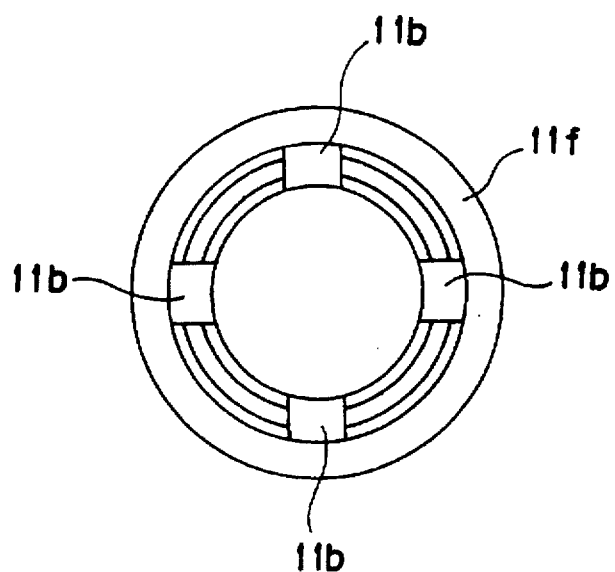
FIG. 4 is a front view of a cam sleeve used for the power carving tool according to this invention.

In FIG. 1, a power carving tool has a housing 1 in which a driving motor 2 as a rotary driving device is accommodated. A switch 3 is provided on the rear side of the driving motor 2 (left side in FIG. 1) and a switch lever 4 is provided in the outer surface of the housing 1 to be connected to the switch 3. A code 5 is connected to the rear end of the housing 1 for supplying power. On the front side of the driving motor 2 is provided an operating portion 6 which operates an output shaft 17 having a carving cutter 24 at its front end for carving wood, marble or stone. The structure of the operating portion 6 is well shown in FIG. 2. The front portion of the driving motor 2 is supported by a fixing plate 7 fixed to the inner wall of the housing 1 via a plurality of screws 9, 9 . . . 9 and a spacer plate 8 which is provided between the front face of the driving motor 2 and the fixing plate 7. The driving motor 2 is provided with a driving shaft 2a which is made from resin as insulating material and pressure-inserted into a cam shaft 10. The driving shaft 2a has, at its front portion, two flat portions 2b and 2b symmetrical in the diagonal direction thereof, and the inner wall of an inserting hole 10a provided in the cam shaft 10 has two flat portions 10b and 10b opposed to the flat portions 2b and 2b of the driving shaft 2a, respectively. The driving shaft 2a is inserted into the cam shaft 10 in such a manner that the flat portions 2b and 10b are opposed to each other to transmit the rotation of the driving shaft 2a to the cam shaft 10. The front portion of the cam shaft 10 is pressure-inserted into the hollow space 11a of a cam sleeve 11 which has a slanted cam surface 11c on the front face of the cam sleeve 11. At a center portion of the outer surface in the axial direction of the cam shaft 10 are provided four projections 10c, 10c . . . 10c at a predetermined interval in its circumferential direction, which are engaged with four recesses 11b, 11b . . . 11b provided at the rear edge of the cam sleeve 11 at a predetermined interval in its circumferential direction, corresponding to the four projections 10c of the cam shaft 10, respectively (FIGS. 3 and 4).

Figure 5:
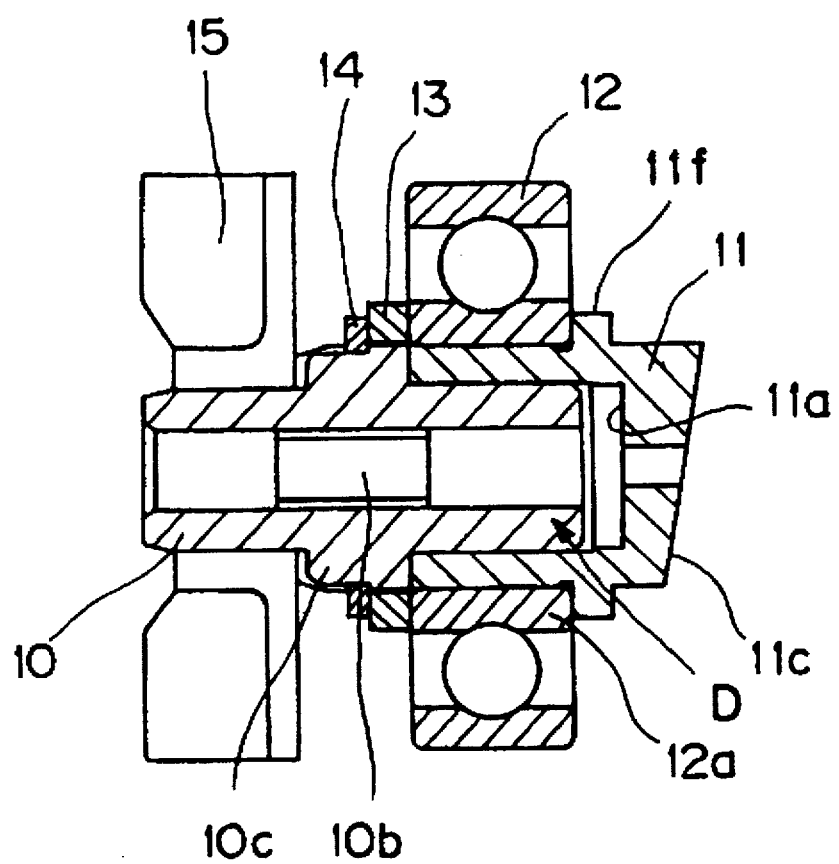
FIG. 5 is an enlarged sectional view of the operating portion of the power carving tool according to this invention.

In FIG. 5, the cam sleeve 11 is forced into the inner ring 12a of a ball bearing 12 whose outer ring 12b is held on a support frame 1b provided in the housing 1 until a flange 11f provided on the outer surface of the cam sleeve 11 abuts against the side face of the inner ring 12a of the ball bearing 12. A plurality of steel balls B, B . . . B is rotatably supported by the outer and inner rings 12a and 12b. The cam sleeve 11 is made from metal so as to have a durability and wear-resisting capacity with respect to a load in the axial and circumferential directions. On the rear outer circumferential surface of the cam sleeve 11 and the outer surfaces of the projections 10c engaged with the recesses 10c formed at the rear edge portion of the cam sleeve 11 is provided an annular groove g to be engaged with a C-shaped stop ring 14 having a cut portion to be expanded and shrunken. The stop ring 14 holds the side face of the ball bearing 12 through a spacer ring 13 to prevent the cam sleeve 11 and the cam shaft 10 from moving in their axial direction with respect to the ball bearing 12. Further, a cooling fan 15 for cooling the driving motor 2 is pressure-engaged with the rear outer surface of the cam shaft 10 to be rotated together with the cam shaft 10.

An output shaft 17 is supported movably in its axial direction by two bearings 16 and 16 provided at an interval at the front end of the housing 1a in such a manner that the axis of the output shaft 17 is deviated by a predetermined distance from the axis of a united rotary driving shaft D comprising the driving shaft 2a, the cam shaft 10 and the cam sleeve 11. The cam shaft 10 and the cam sleeve 11 may be integrally formed. At a rear end face of the output shaft 17, opposed to the cam surface of the cam sleeve 11 is provided a recess 17a for accommodating grease and a rotatable steel ball 19 which is opposed to the cam surface 11c. The output shaft 17 has, near its rear end, a pin 20 which is engaged with an stop ring 21 slidably on the outer surface of the output shaft 17 (FIG. 2). Between the stop ring 21 and the bearing 16 supporting the rear portion of the output shaft 17 is provided a coil spring 22 for urging the output shaft 17 usually in its front direction. The output shaft 17 has, at its front end, a fastening nut 23 screw-engaged with a screw portion 17s of the output shaft 17 for detachably supporting the carving cutter 24.

The operation of the power carving tool having a structure as mentioned above will now be explained.

In FIG. 1, the switch lever 4 is moved to operate the switch 3 and the motor 2 is driven. The driving of the motor 2 causes the driving shaft 2a to rotate, and the rotation of the driving shaft 2a is transmitted to the cam shaft 10 through the flat portion 2b of the driving shaft 2a and the flat portion 10b of the cam shaft 10 thereby to rotate the cam shaft 10. The rotation of the cam shaft 10 is transmitted to the cam sleeve 11 by engagement of the projections 10c and the engaging recesses 11b of the cam sleeve 11 and by pushing the front portion of the cam shaft 10 into the recess 11a of the cam sleeve 11. At this time, since the front portion of the cam sleeve 11 is pushed into the inner ring 12a of the ball bearing 12, the inner ring 12a thereof is rotated together with the united rotary driving shaft D including the driving shaft 2a, cam shaft 10 and the cam sleeve 11. Therefore, the cam sleeve 11 can be steadily rotated, and the cam shaft 10 can be also steadily rotated. This structure makes the cooling fan 15 possible to be disposed on the rear end portion of the cam shaft 10 to cool the driving motor 2. With this state, the operator makes the front end of the carving cutter 24 touch a work to be carved. When the carving cutter 24 abuts against the surface of the work, the output shaft 17 is moved rearwardly to make the steel ball 19 held at the rear face of the output shaft 17 abut against the cam shaft 11c of the cam sleeve 11 while shrinking the coil spring 22. The output shaft 17 is moved reciprocatingly in accordance with the rotation of the cam sleeve 11 thereby to carve the work.

In this case, since the cam sleeve 11 is held steadily in the inner ring 12a of the ball bearing 12, the cam sleeve 11 is not moved in its axial direction to maintain a stable rotation of the cam sleeve 11 even if the cam surface 11c of the cam sleeve 11 receives a force by the steel ball 19 which collides with the cam surface 11c at a deviated position from the center axis of the united rotary driving shaft D including the cam sleeve 11, etc.

Next, other embodiments of this invention will now be explained.

The same members as those in the above embodiment are indicated by the same numbers, and detailed explanations are omitted.

In FIG. 6, part of each of four projections 10d, 10d - - - 10d corresponding to four projections 10c, 10c - - - 10c in the above embodiment is extended radially outwardly so as to hold directly the rear side of the inner ring 12a of the ball bearing 12, cooperating with the flange 11f provided on the front outer surface of the cam sleeve 11. Adjacent to the projections 10d is provided a C-shaped stop ring 14 without the spacer ring 13 in FIG. 5 to prevent the cam shaft 10 and the cam sleeve 11 from being separated from each other. This structure can eliminate the provision of the spacer ring 13 to decrease the number of parts. Therefore, the assembly of the device can be facilitated.

Figure 7:
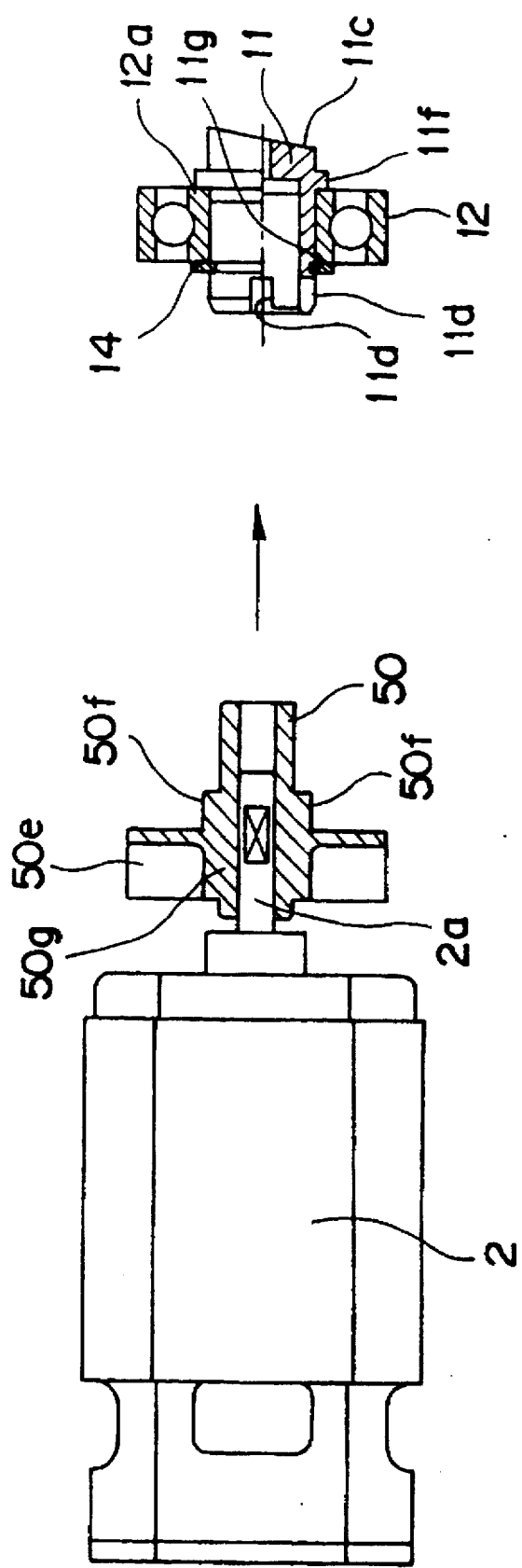
FIG. 7 is an enlarged view of an essential part of the power carving tool according to this invention.
Figure 8:
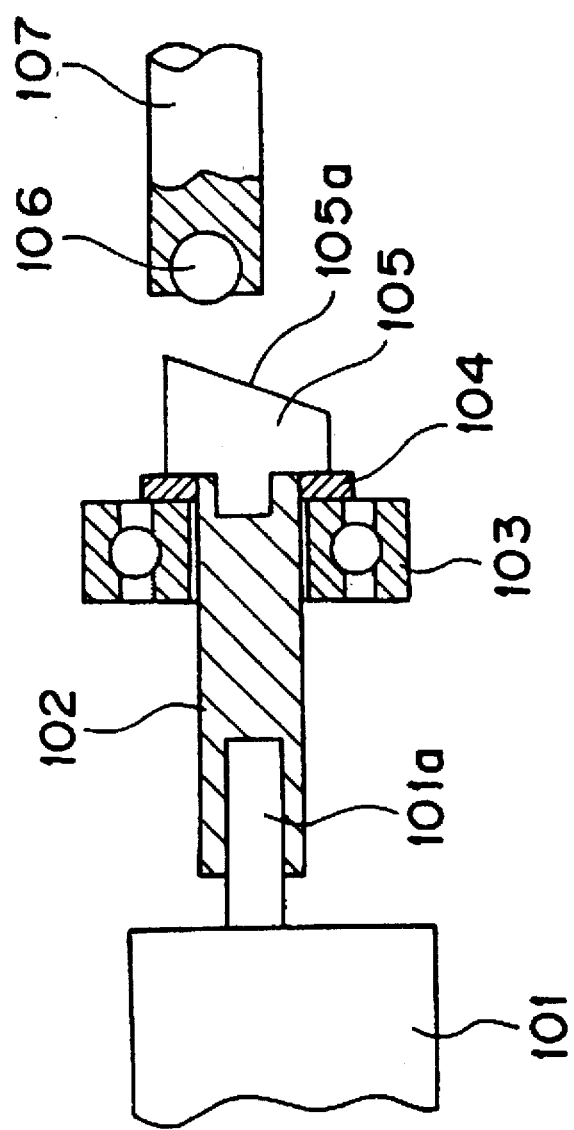
FIG. 8 ia an enlarged view of an essential part of a conventional power carving tool.

FIG. 7 shows other embodiment. The same members as those in the above embodiments are indicated by the same numbers, and detailed explanations are omitted.

In this embodiment, a cam shaft 50 is integrally provided with a cooling fan 50e, and the driving shaft 2a of the motor 2 is pressure-inserted into the cam shaft 50. The cam shaft 50 has, at a center portion on the outer surface thereof, four projections 50f, 50f - - - 50f which are engaged with the four recesses 11d, 11d - - - 11d provided at the rear edge of the cam sleeve 11, respectively, to reliably transmit the rotation of the cam shaft 10 to the cam sleeve 11.

The hub portion 50g of the cooling fan 50e is formed continuously from the projections 50f. The cam sleeve 11 is forced into the inner ring 12a of the ball bearing 12 and the inner ring 12a of the ball bearing 12 is held between the flange 11f provided on the outer surface of the cam sleeve 11 and the C-shaped stop ring 14 which is engaged with an annular groove 11g formed on the outer circumferential surface of the cam sleeve 11 to prevent the cam sleeve 11 from coming out of the ball bearing 12. Thus, the cam sleeve 11 is reliably held by the ball bearing 12.

In the above three embodiments, the cam shafts 10, 10 and 50 are made from resin as insulating material to form a double insulating structure together with an insulating function with which the motor 2 is originally provided. Further, if each of the cam shafts 10 and 40 is reliably forced into the cam sleeve 11, the spacer 13 and the C-shaped ring 14 can be eliminated.

According to this invention, the cam sleeve 11 is forced into the ball bearing 12, so that the cam sleeve 11 is rotated integrally with the inner ring 12a of the ball bearing 12 and the relative axial movement of the cam sleeve 11 and the ball bearing 12 is restricted. Therefore, the cam sleeve 11 is steadily rotated to prevent the generation of mechanical loss, resulting in the increase of durability. Further the cam surface 11c is not irregularly collided with the steel ball 19 held by the output shaft 17 to prevent the generation of abnormal sound. In addition, the rotation of the cam shafts 10 and 40 is stable, and the cam shaft 10 can be forced into the cooling fan 15 or formed integrally with the cam shaft 40 to make the power carving tool compact. If the cam shafts 10 and 40 are made from resin having an insulating function, a double insulating function can be formed together with an insulating function with which the motor 2 is originally provided to enhance an insulating effect.

What is claimed is:

1. A power carving tool, which comprises:
   a) a housing in which a ball bearing is supported;
   b) a rotary driving device;
   c) a cam shaft which is engaged with a driving shaft of the rotary driving device so as to be rotated together with the driving shaft;
   d) a cam sleeve which is rotated with the cam shaft, which is inserted into an inner ring of the ball bearing as to be rotated together with the inner ring, and which has, at a front face thereof, a cam surface; and
   e) an output shaft which is disposed in such a manner that an axis of the output shaft is deviated from an axis of a united rotary driving shaft comprising the driving shaft of the rotary driving device, the cam shaft and the cam sleeve, wherein the output shaft has, at a rear end thereof, a contact portion for contacting the cam surface to be moved reciprocatingly in accordance with rotation of the united rotary driving shaft, and holds detachably a carving cutter at a front end thereof.

2. A power carving tool according to claim 1, wherein a cooling fan for cooling the rotary driving device is provided on the cam shaft between the ball bearing and the rotary driving device.

3. A power carving tool according to claim 2, wherein the cooling fan is formed separately from the cam shaft, and the cooling fan is fixed to an outer surface of the cam shaft so that a hub portion of the cooling fan is forced onto the outer surface of the cam shaft.

4. A power carving tool according to claim 2, wherein the cooling fan is integrally formed with the cam shaft.

5. A power carving tool according to claim 1, wherein the cam shaft has, at an outer surface thereof, a plurality of projections for engaging a plurality of recesses provided at a rear edge of the cam sleeve.

6. A power carving tool according to claim 5, wherein the cam sleeve has, at a front outer surface thereof, a flange abutting against a front face of the inner ring of the ball bearing, a stop ring being provided on an engaging outer surface between the projections of the cam shaft and the recesses of the cam sleeve to prevent the cam sleeve from coming out of the cam shaft, a spacer ring being provided between a rear face of the inner ring of the ball bearing and the stop ring to prevent the cam sleeve from moving with respect to the ball bearing.

7. A power carving tool according to claim 5, wherein the cam sleeve has, at a front outer surface thereof, a flange abutting against a front face of the inner ring of the ball bearing, part of the projections being extended outwardly so as to abut against a rear face of the inner ring of the ball bearing, a stop ring being provided on an engaging outer surface between the projections of the cam shaft and the recesses of the cam sleeve.

8. A power carving tool according to claim 1, wherein the cam sleeve has, at a front outer surface thereof, a flange abutting against a front face of the inner ring of the ball bearing, a stop ring being provided on a rear outer surface of the cam sleeve to hold the inner ring of the ball bearing between the flange and the stop ring.

9. A power carving tool according to claim 1, wherein the cam shaft is made from resin as an insulating material.

10. A power carving tool according to claim 1, wherein the contact portion of the outer shaft comprises a steel ball accommodated in a recess provided in a rear face of the output shaft.

11. A power carving tool according to claim 10, wherein the output shaft is urged by an elastic member to a front direction thereof.

12. A power carving tool which comprises:
   a) a housing;
   b) a rotary driving device;
   c) a cam shaft which is engaged with a driving shaft of the rotary driving device so as to be rotated together with the driving shaft;
   d) a cam sleeve which is rotated with the cam shaft, which is held by a ball bearing supported in the housing so as to be rotated together with an inner ring of the ball bearing, and which has, at a front face thereof, a cam surface; and
   e) an output shaft which is disposed in such a manner that an axis of the output shaft is deviated from an axis of a united rotary driving shaft comprising the driving shaft of the rotary driving device, the cam shaft and the cam sleeve,
   wherein the output shaft has, at a rear end thereof, a contact portion for contacting the cam surface to be moved reciprocatingly in accordance with rotation of the united rotary driving shaft, and holds detachably a carving cutter at a front end thereof,
   wherein the cam shaft has, at an outer surface thereof, a plurality of projections for engaging a plurality of recesses provided at a rear edge of the cam sleeve, and wherein the cam sleeve has, at a front outer surface thereof, a flange abutting against a front face of the inner ring of the ball bearing, a stop ring being provided on an engaging outer surface between the projections of the cam shaft and the recesses of the cam sleeve to prevent the cam sleeve from coming out of the cam shaft, a spacer ring being provided between a rear face of the inner ring of the ball bearing and the stop ring to prevent the cam sleeve from moving with respect to the ball bearing.

13. A power carving tool which comprises:

a) a housing;

b) a rotary driving device;

c) a cam shaft which is engaged with a driving shaft of the rotary driving device so as to be rotated together with the driving shaft;

d) a cam sleeve which is rotated with the cam shaft, which is held by a ball bearing supported in the housing so as to be rotated together with an inner ring of the ball bearing, and which has, at a front face thereof, a cam surface; and e) an output shaft which is disposed in such a manner that an axis of the output shaft is deviated from an axis of a united rotary driving shaft comprising the driving shaft of the rotary driving device, the cam shaft and the cam sleeve, wherein the output shaft has, at a rear end thereof, a contact portion for contacting the cam surface to be moved reciprocatingly in accordance with rotation of the united rotary driving shaft, and holds detachably a carving cutter at a front end thereof, wherein the cam shaft has, at an outer surface thereof, a plurality of projections for engaging a plurality of recesses provided at a rear edge of the cam sleeve, and wherein the cam sleeve has, at a front outer surface thereof, a flange abutting against a front face of the inner ring of the ball bearing, part of the projections being extended outwardly so as to abut against a rear face of the inner ring of the ball bearing, a stop ring being provided on an engaging outer surface between the projections of the cam shaft and the recesses of the cam sleeve.

* * * * *